Dec. 21, 1965 G. LEUENBERGER 3,225,152

PROGRAM CONTROLLER USING A PUNCHED CARD DISC AND AN ELECTROMAGNETIC CLUTCH

Filed June 25, 1963

INVENTOR

Gottfried Leuenberger

BY Lowry & Rinehart

ATTORNEYS

United States Patent Office 3,225,152

Patented Dec. 21, 1965

3,225,152

PROGRAM CONTROLLER USING A PUNCHED CARD DISC AND AN ELECTROMAGNETIC CLUTCH

Gottfried Leuenberger, Schlieren, Zurich, Switzerland, assignor to Maschinenfabrik Ad. Schulthess & Co. AG, Zurich, Switzerland, a firm

Filed June 25, 1963, Ser. No. 290,494
2 Claims. (Cl. 200—46)

This invention relates to a program controller using a punched card disc and an electromagnetic clutch.

Such program controllers are already known. They render possible the repetition of any desired operating program phase. However, in known apparatus adequate provision has not been made for preventing the hand operated turning of the punched card disc during rotation of the drive motor.

It is therefore the object of the present invention to provide a program controller which allows the hand operated turning of the punched card disc only upon interruption of the main circuit, i.e. during stoppage of the drive motor.

One form of the invention is shown, by way of example, in the drawing, in which—

Figures 1, 2, 3:
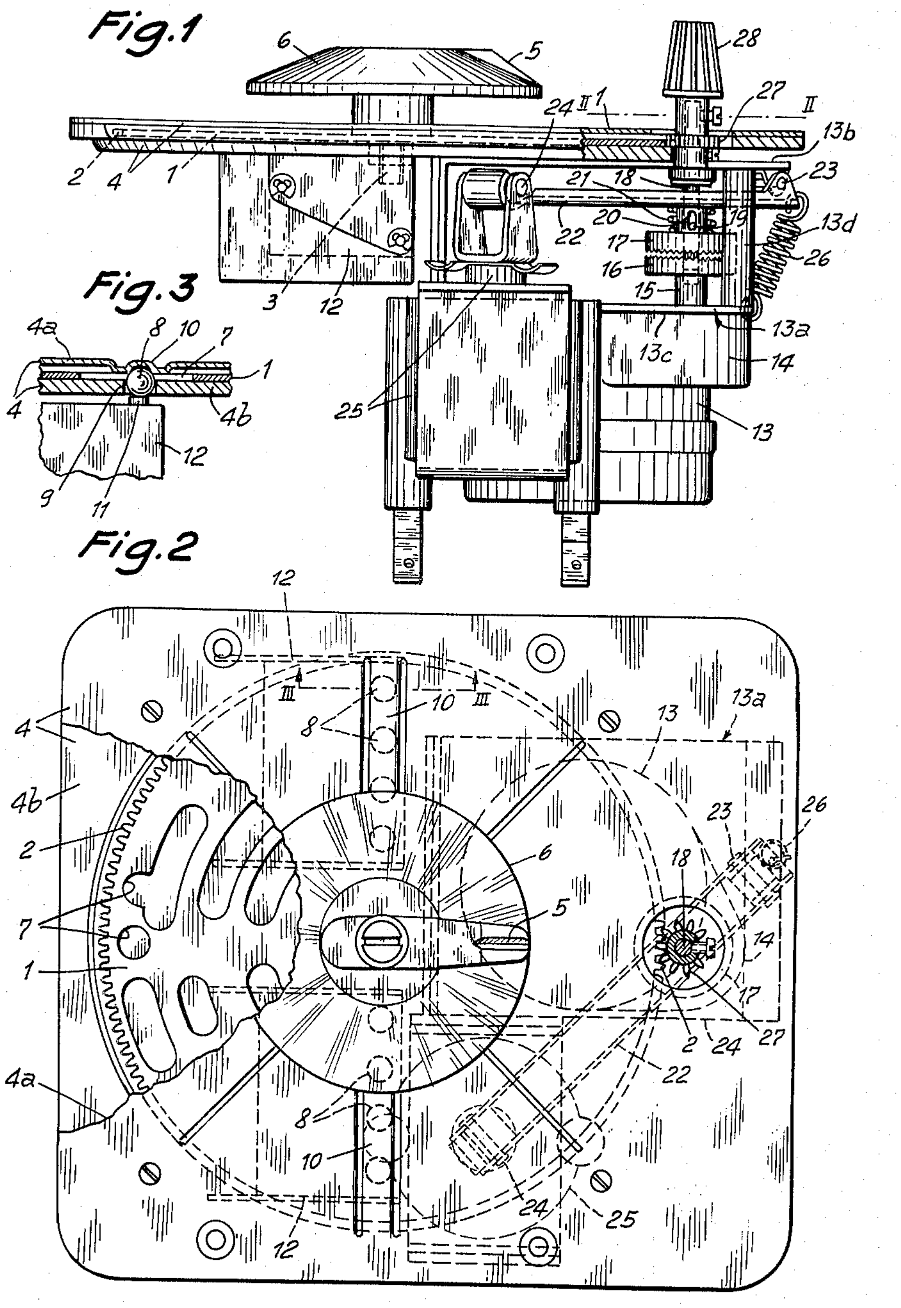
FIG. 1 is a side view of the controller, partially in section.
FIG. 2 shows a top plan view of the unit illustrated in FIG. 1, partially in section on the line II—II of FIG. 1.
FIG. 3 shows a partial cross-section on the line III—III of FIG. 2.

A punch card disc 1 is provided with a rim gearing 2 and is rotatably mounted by means of an axle pin 3 in a flat casing 4 of which 4*a* is the top and 4*b* the bottom plate. The setting of disc 1 with respect to a program card provided on casing 4, may be read from a disc 6 that is fixed to axle pin 3 and is provided with a mark 5. The various holes and slots 7 coact with engaging and disengaging balls 8 which are guided in holes 9 (FIG. 3) of the casing bottom plate 4*b*.

The balls 8 may enter into a bulge 10 of casing cover plate 4*a* when they drop into the openings 7 of disc 1, while at the end of a slot 7 they engage and depress through disc 1 the associated switch button 11 of the respective single switch of a package switch 12. The single switches of the package switches 12 through cables are connected to the different electric switching elements, drive motors, valves and relays of the washing machine and are controlled, on rotation of disc 1 in accordance with an operating program as determined by the location and arrangement of the slots and holes.

Disc 1 is rotated by a motor 13 through a gearing unit 14. The gearing shaft 15 carries a stationary coupling disc 16 provided with fine serrations to which is engageable a shiftable coupling disc 17 of a coupling shaft 18, which latter disc is provided with fine counter serrations. Coupling shaft 18 is mounted in the bracket 13*a* of motor 13 and carries a cross-pin 19 that traverses a slot 20 of the hub of the shiftable coupling disc 17 to render possible a limited longitudinal movement of disc 17 on shaft 18. The bracket 13*a* includes a pair of parallel first and second flanges 13*b*, 13*c*, respectively, interconnected by a web 13*d*. As is best illustrated in FIG. 1 of the drawings, the casing 4 is mounted on the outside of the first flange 13*b*, and the drive motor 13 is mounted on the outside of the second flange 13*c*.

A compression spring 21 mounted on the hub of disc 17 is supported on one hand on disc 17 and, on the other hand, on a coupling lever 22. Spring 21 tends to push disc 17 within certain limits against disc 16 and to hold it in the engaged state while a tension spring 26 tends to disengage the coupling discs 16, 17. Coupling lever 22 at one end and at 23 is pivoted to bracket 13*a* of motor 13, and its other end engages the armature of an electromagnet 25 by a fork joint 24. A tension spring 26 which engages that arm of lever 22 that is opposite fork joint 24, tends to swing lever 22 into its disengaged position.

Punched card disc 1 is driven through a pinion 27 that meshes with the rim gear 2 thereof and is fixed to coupling shaft 18. A selector knob 28 fixed to the upper end of coupling shaft 18 permits, when coupling 16 and 17 is disengaged, to adjust disc 1 as desired, the impending phases of successive operations being readable on the program card from the corotating mark 5 of disk 6.

Upon interruption of the main circuit at the end of the operating program or upon arbitrary actuation of the main switch, punched card disc 1 by means of knob 28 may be turned or set in either sense of rotation, so that disc 1 may be set for repetition of any desired operating program phase. When electro-coupling 16, 17 is closed through switching-on the main circuit, punched card disc 1 is rotated by motor 13 so that the disc cannot be turned any longer as desired by means of knob 28.

The program controller disclosed above is particularly suitable for issuing control commands to automatic washing machines, however is of course also applicable to other power engines and servo-mechanisms.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

What I claim as new and desire to secure by Letters Patent is:

1. A program controller using a punched card disc and an electromagnetic clutch, comprising in combination: a bracket consisting of a first flange and a second flange, said flanges being arranged parallel with each other and interconnected by at least one web, a flat casing mounted on the outside of the first flange, a drive motor mounted on the outside of the second flange and comprising a gearing shaft traversing said second flange, a coupling shaft carried by the flat casing and traversing the first flange, a selector knob fixed to the outer end of the coupling shaft, a pinion fixed to said coupling shaft and meshing with a rim gear of the punched card disc rotatably mounted in said flat casing, a stationary coupling disc rigidly mounted on the gearing shaft, a shiftable coupling disc mounted on the coupling shaft, a coupling lever at one end pivoted to said web of the bracket and at the other end engaging the armature of an electromagnet connected in series with the drive motor, said coupling lever being adapted to engage said shiftable coupling disc to said stationary coupling disc against spring action upon excitation of said electromagnet.

2. A program controller as in claim 1, wherein the coupling shaft carries a cross-pin traversing an axial slot in the hub of the shiftable coupling disc, and a compression spring arranged between the hub and the coupling lever.

References Cited by the Examiner

UNITED STATES PATENTS

| | | | |
|---|---|---|---|
| 1,090,816 | 3/1914 | Henschel | 200—46 X |
| 1,872,273 | 8/1932 | Goebel | 200—38 X |

KATHLEEN H. CLAFFY, *Primary Examiner.*

ROBERT K. SCHAEFER, *Examiner.*